(12) United States Patent
Jin et al.

(10) Patent No.: US 11,286,773 B2
(45) Date of Patent: Mar. 29, 2022

(54) USING FIBER-OPTIC DISTRIBUTED SENSING TO OPTIMIZE WELL SPACING AND COMPLETION DESIGNS FOR UNCONVENTIONAL RESERVOIRS

(71) Applicant: Neubrex Co., Ltd., Kobe (JP)

(72) Inventors: Ge Jin, Houston, TX (US); Kinzo Kishida, Hyogo (JP)

(73) Assignee: NEUBREX CO., LTD., Kobe (JP)

( * ) Notice: Subject to any disclaimer, the term of this patent is extended or adjusted under 35 U.S.C. 154(b) by 33 days.

(21) Appl. No.: 16/815,558

(22) Filed: Mar. 11, 2020

(65) Prior Publication Data
US 2021/0285322 A1 Sep. 16, 2021

(51) Int. Cl.
| | |
|---|---|
| *E21B 47/06* | (2012.01) |
| *E21B 43/30* | (2006.01) |
| *E21B 49/00* | (2006.01) |
| *G01V 1/22* | (2006.01) |
| *G01V 1/42* | (2006.01) |
| *E21B 43/267* | (2006.01) |

(Continued)

(52) U.S. Cl.
CPC ............ *E21B 49/00* (2013.01); *E21B 43/267* (2013.01); *E21B 43/305* (2013.01); *E21B 47/06* (2013.01); *E21B 47/07* (2020.05); *G01V 1/226* (2013.01); *G01V 1/42* (2013.01); *E21B 7/046* (2013.01); *G01V 2210/6244* (2013.01)

(58) Field of Classification Search
CPC ........ E21B 47/06; E21B 43/30; E21B 43/305; G01V 1/226
See application file for complete search history.

(56) References Cited

U.S. PATENT DOCUMENTS

| | | | |
|---|---|---|---|
| 4,926,940 A | 5/1990 | Stromswold | |
| 7,107,154 B2* | 9/2006 | Ward | E21B 47/008 702/6 |

(Continued)

FOREIGN PATENT DOCUMENTS

| | | |
|---|---|---|
| WO | 2014027592 A1 | 2/2014 |
| WO | 2014181617 A1 | 11/2014 |

OTHER PUBLICATIONS

Palisch et al., "Recent Advancements in Far-Field Proppant Detection", SPE-179161-MS, Society of Petroleum Engineers, Feb. 9-11, 2016 (25 pages).

(Continued)

*Primary Examiner* — Catherine Loikith
(74) *Attorney, Agent, or Firm* — Buchanan Ingersoll & Rooney PC

(57) ABSTRACT

An oil well production method in which a plurality of producers are arranged in a horizontal direction, includes boring a monitor well adjacent to one of the producers in the horizontal direction, installing a measurement optical fiber cable in the monitor well, performing Brillouin measurement and Rayleigh measurement for a strain distribution, a pressure distribution, and a temperature distribution of the monitor well along the measurement optical fiber cable over a period in which a fracture occurs hydraulically in the producers and an oil producing period, analyzing data measured through the Brillouin measurement and the Rayleigh measurement, and determining an arrangement interval of the producers in the horizontal direction and a hydraulic fracturing parameter.

7 Claims, 8 Drawing Sheets

(51) Int. Cl.
*E21B 47/07* (2012.01)
*E21B 7/04* (2006.01)

(56) References Cited

U.S. PATENT DOCUMENTS

| | | | | |
|---|---|---|---|---|
| 8,200,465 | B2* | 6/2012 | Suarez-Rivera | E21B 43/00 703/10 |
| 9,557,196 | B2* | 1/2017 | Xue | G01K 11/32 |
| 9,829,352 | B2* | 11/2017 | Xue | G01D 5/35361 |
| 2008/0183451 | A1* | 7/2008 | Weng | E21B 43/26 703/10 |
| 2013/0206384 | A1* | 8/2013 | Pantin | E21B 43/243 166/50 |
| 2016/0259079 | A1* | 9/2016 | Wilson | E21B 7/06 |
| 2016/0369607 | A1* | 12/2016 | Roy | E21B 47/135 |
| 2018/0238169 | A1* | 8/2018 | Sun | E21B 41/0092 |
| 2019/0301276 | A1 | 10/2019 | Jin et al. | |
| 2021/0073314 | A1* | 3/2021 | Ray | E21B 47/06 |

OTHER PUBLICATIONS

Kishida et al., "Study of Optical Fibers Strain-Temperature Sensitivities Using Hybrid Brillouin-Rayleigh System", Photonic Sensors, 2014, vol. 4, No. 1, pp. 1-11.

Boone et al., "Monitoring Hydraulic Fracturing Operations Using Fiber-Optic Distributed Acoustic Sensing", URTeC: 2158449, Unconventional Resources Technology Conference, Jul. 20-22, 2015, pp. 316-322.

Liu et al., "Time-lapse Geochemistry (TLG) Application in Unconventional Reservoir Development", URTeC: 2670186, Unconventional Resources Technology Conference, Jul. 24-26, 2017. (17 pages).

Webster et al., "Micro-Seismic Detection using Distributed Acoustic Sensing", SEG Houston 2013 Annual Meeting, http://dx.doi.org/10.1190/segam2013-0182.1, pp. 2459-2463.

Jin et al., "Hydraulic-fracture geometry characterization using low-frequency DAS signal", Dec. 2017, The Leading Edge, https://doi.org/10.1190/tle36120975.1. pp. 975-980.

Raterman et al., "Analysis of a Drained Rock Volume: An Eagle Ford Example", URTeC: 263, Unconventional Resources Technology Conference, Jul. 22-24, 2019, (20 pages).

* cited by examiner

USING FIBER-OPTIC DISTRIBUTED SENSING TO OPTIMIZE WELL SPACING AND COMPLETION DESIGNS FOR UNCONVENTIONAL RESERVOIRS

BACKGROUND

Horizontal drilling and hydraulic fracturing operation are widely used to develop low-permeability unconventional plays. Horizontal drilling is a technology that drills a well at a certain depth horizontally. The well path usually follows the formation of interest to increase contact with the reservoir rocks. Hydraulic fracturing operation includes injecting a large volume of water and proppant mixture (slurry) into the horizontal wells. The slurry enters the reservoir through the designed perforations and creates fractures hydraulically inside the reservoir. After the injection stops, as the injected water leaks off through the fracture into the reservoir matrix, the proppant remains in the fractures to keep them open. The hydrocarbon resources within the reservoir rock matrix slowly flow through the propped fractures into the well during the production stage.

The most important design decisions for unconventional reservoir development are well spacing and fracturing parameters. These designs significantly, if not deterministically, affect the cost of hydrocarbon production. As a result, they need to be optimized to achieve better economic results. Well spacing refers to the vertical or horizontal distances between the horizontal section of adjacent wells. Large well spacing may risk leaving resources behind, which increases average land leasing cost; while small well spacing may lead to underperformance due to production interference between the wells, and increases the drilling and completion cost of the field. Fracturing parameters include perforation cluster spacing, number of clusters per stage, injection volume, proppant concentration, proppant size, etc. More intensive fracturing designs (e.g. higher injection volume, shorter cluster spacing) may generate denser and longer fracture networks, at the expense of increased completion cost. On the other hand, less intensive fracturing designs may cause poor production performance and reduced recovery rate. Optimizing these parameters is the key to the success of unconventional reservoir development.

The geometry of Drainage Reservoir Volume (DRV) is one of the most important factors to consider when determining well spacing and fracturing parameters. DRV is defined as the rock volume within which the well drains the hydrocarbon during its lifespan. For unconventional reservoirs, DRV highly correlates with the geometry of propped hydraulic fractures, which are the fractures with proppant inside and remaining conductive during the production stage. The geometry of DRV is determined by hydraulic fracture geometry and proppant transportation within the fractures (Raterman et al. 2019). Hydraulic fracture geometry is controlled by factors including local stress anisotropy, rock geomechanical properties, reservoir heterogeneities, pre-existing natural fractures, injection fluid viscosity, etc. Proppant transportation within the fractures can be affected by fracture surface roughness, natural fracture interference, fracture fluid leak-off rate, proppant size, and other factors. It is very difficult, even impossible in most cases, to accurately predict or model the DRV geometry using numerical simulation.

Currently, there are very few methods that measure the DRV directly. Radioactive tracers can be added to the proppant for later detection after the injection using a downhole tool (e.g. Stromswold 1990). This method can measure the proppant distribution around the injection well, but the detection radius is very small (less than a foot) and cannot provide DRV information at far-field. Palisch et al. (2016) proposed using electromagnetic methods to detect proppant mixed with metal particles in the formation. This method can provide far-field proppant distribution but is subject to low spatial resolution and has not been commercialized. Geochemistry analysis of the produced oil can reveal the geometry of vertical drainage (e.g. Liu et al. 2017), however it does not put constraints on horizontal well spacing.

Fiber-Optic Sensing (FOS) technology has become popular in the oil industry in recent years. The latest development has enabled several FOS applications for hydraulic fracturing monitoring, including injection allocation (e.g. Boone et al. 2015), hydraulic-fracture geometry constraint (Jin & Roy 2017), microseismic monitoring (e.g. Webster et al. 2013), and others. Among the various service providers, Neubrex Co., Ltd. developed a FOS solution that is unique in the industry (e.g. Kishida et al. 2014). By deploying a single cable (FIG. 9), the system measures distributed temperature, strain, and pressure variations along the fiber with high spatial and temporal resolution. The frequency shifts are known to be expressed as:

$$\Delta v_B = C_{11}\Delta\varepsilon + C_{12}\Delta T + C_{13}\Delta P \quad (1)$$

$$\Delta v_R = C_{21}\Delta\varepsilon + C_{22}\Delta T + C_{23}\Delta P \quad (2)$$

where $\Delta v_B$ and $\Delta v_R$ are the frequency shift of Brillouin and Rayleigh backscattering light at the specific location.

The FOS system developed by Neubrex is known as a distributed optical fiber measurement system (hereinafter, abbreviated as "measurement system") which measures the pressure, temperature, and strain of a measurement object all at once by using frequency information about Rayleigh scattering and Brillouin scattering of an optical fiber (for example, International Publication No. 2014-181617).

Here, Rayleigh scattering light has characteristics that, when the scattering light obtained by light entering an optical fiber is subjected to frequency analysis, the scattering light has almost the same frequency as the entering light, and meanwhile, Brillouin scattering light has characteristics that the frequency thereof is different from that of the entering light by about several to several ten GHz.

Rayleigh scattering is a scattering phenomenon caused by light scattering due to fluctuation of the refractive index in an optical fiber, and the frequency difference between entering light and Rayleigh scattering light is Rayleigh frequency. The Rayleigh frequency changes due to strain, temperature, or pressure applied to the optical fiber, and hereafter, this change is referred to as Rayleigh frequency shift $\Delta v_R$.

On the other hand, Brillouin scattering is a phenomenon in which, when light enters an optical fiber, power transfers via an acoustic phonon of the optical fiber, and the frequency difference between the entering light and Brillouin scattering light is Brillouin frequency. The Brillouin frequency is proportional to the speed of sound in the optical fiber, and the speed of sound depends on the strain and temperature of the optical fiber. Therefore, it is possible to measure the strain, temperature, or pressure applied to the optical fiber by measuring change in the Brillouin frequency. Hereafter, this change is referred to as Brillouin frequency shift $\Delta v_B$.

A typical example of the above measurement system is an optical fiber cable system having an armored cable. An optical fiber cable used in this system is provided with multilayer armored wires, and made up of a fiber in metal tube (FIMT) which is an optical fiber having a sensor function such as a temperature sensor, an optical waveguide which is a sensor function part of an optical fiber core, and others. This cable is fixed to a stratum by cementing or the like.

The above measurement system includes a hybrid-type backscattered light measuring device configured to cause light to enter the above two kinds of optical fibers and then measure and analyze a Rayleigh frequency shift $\Delta v_R$ and a Brillouin frequency shift $\Delta v_B$ which are frequency shifts between the entering light and the scattering light in the two kinds of optical fibers and which are frequency shifts having properties different from each other.

The measurement system configured as described above can accurately measure distributions of pressure P, temperature T, and strain c of a borehole which is a measurement target, all at once.

In this case, the Brillouin frequency shift $\Delta v_B$ and the Rayleigh frequency shift $\Delta v_R$ can be respectively represented as shown by the above Eqs. (1) and (2) using a pressure change amount $\Delta P$, a temperature change amount $\Delta T$, and a strain change amount $\Delta \varepsilon$.

Here, in Eqs. (1) and (2), $C_{ij}$ is a coefficient specific to each optical fiber. If these coefficients are calculated in advance for the optical fibers to be used, it is possible to calculate distributions of the pressure change amount $\Delta P$, the temperature change amount $\Delta T$, and the strain change amount $\Delta \varepsilon$ as described below.

Here, it is assumed that $\Delta v_B$ and $\Delta v_R$ have been measured. With these measured values, in order to calculate each of the pressure P, the temperature T, and the strain c separately from each other without each other's influence, at least three or more independent measurement quantities are needed. Only two independent measurement values $\Delta v_B$ and $\Delta v_R$ are obtained with one optical fiber. Therefore, in order to obtain three or more independent measurement quantities, here, two kinds of optical fibers having different sensitivities with respect to the pressure change amount $\Delta P$, the temperature change amount $\Delta T$, and the strain change amount $\Delta E$ are used, thereby obtaining four independent measurement values (see the following Eq. (3)).

$$\left.\begin{array}{l} \Delta v_B^1 = C_{11}^1 \Delta \varepsilon^1 + C_{12}^1 \Delta T + C_{13}^1 \Delta P \\ \Delta v_R^1 = C_{21}^1 \Delta \varepsilon^1 + C_{22}^1 \Delta T + C_{23}^1 \Delta P \\ \Delta v_B^2 = C_{11}^2 \Delta \varepsilon^2 + C_{12}^2 \Delta T + C_{13}^2 \Delta P \\ \Delta v_R^2 = C_{21}^2 \Delta \varepsilon^2 + C_{22}^2 \Delta T + C_{23}^2 \Delta P \end{array}\right\} \quad (3)$$

Here, the superscript numerals denote the kinds of the optical fibers. The pressure and the temperature are those at the field where the optical fibers exist, and therefore have the same values between the two kinds of fibers. On the other hand, the value of strain depends on whether or not the optical fiber is fixed to the surrounding object. In a distributed pressure, temperature and strain system (DPTSS), it is necessary to measure strain of the surrounding object around the fiber, and therefore at least one optical fiber needs to be fixed to the surrounding object.

Accordingly, by solving simultaneous equations in the above Eq. (3), it is possible to separate the influences of the pressure P, the temperature T, and the strain c from each other. Therefore, by performing hybrid measurement including Brillouin frequency shift measurement (hereafter, may be referred to as Brillouin measurement) and Rayleigh frequency shift measurement (hereafter, may be referred to as Rayleigh measurement) using the above measurement system, and then solving the simultaneous equations in Eq. (3), it is possible to calculate distributions of the pressure change amount $\Delta P$, the temperature change amount $\Delta T$, and the strain change amount $\Delta E$ along the optical fiber.

Next, the measurement procedure in the above measurement system will be described. First, regarding Brillouin scattering, the Brillouin frequency shift $\Delta v_B$ between entering light and scattering light is represented by Eq. (4).

$$\left.\begin{array}{l} \Delta v_B^1 = C_{11}^1 \Delta \varepsilon^1 + C_{12}^1 \Delta T + C_{13}^1 \Delta P \\ \Delta v_B^2 = C_{11}^2 \Delta \varepsilon^2 + C_{12}^2 \Delta T \end{array}\right\} \quad (4)$$

Here, the superscript numerals of $\Delta v_B$ denote the kinds of optical fibers: "1" refers to the optical waveguide and "2" refers to the FIMT. The coefficients $C_{ij}$ are sensitivity coefficients specific to the optical fibers, and the superscript numerals refer to the respective kinds of optical fibers as with the above. The superscript numerals of c also refer to the respective kinds of optical fibers as with the above. In addition, that no term relating to $\Delta P$ appears in the expression at the lower stage in Eq. (4) is due to the fact that the FIMT is isolated from influence of pressure.

Next, the Rayleigh frequency shift $\Delta v_R$ is represented by the following Eq. (5).

$$\left.\begin{array}{l} \Delta v_R^1 = C_{21}^1 \Delta \varepsilon^1 + C_{22}^1 \Delta T + C_{23}^1 \Delta P \\ \Delta v_R^2 = C_{21}^2 \Delta \varepsilon^2 + C_{22}^2 \Delta T \end{array}\right\} \quad (5)$$

Here, the superscript numerals of $\Delta v_R$ denote the kinds of optical fibers: "1" refers to the optical waveguide and "2" refers to the FIMT. In addition, that no term relating to $\Delta P$ appears in the expression at the lower stage in Eq. (5) is due to the fact that the FIMT is isolated from influence of pressure. The definitions of the other symbols are the same as those with $\Delta v_B$; hence, they are omitted here.

From these Eqs. (4) and (5), using characteristic coefficients $D_{ij}$ (which are characteristic coefficients based on frequency shifts and determined as the inverse matrix of $C_{ij}$) determined from the sensitivity coefficients $C_{ij}$, a relationship expressed by the following Eq. (6) holds true between: the pressure change amount $\Delta P$, the temperature change amount $\Delta T$, and the strain change amount $\Delta \varepsilon$; and $\Delta v_B$ and $\Delta v_R$.

$$\begin{pmatrix} \Delta P \\ \Delta T \\ \Delta \varepsilon^1 \\ \Delta \varepsilon^2 \end{pmatrix} = (D_{ij}) \begin{pmatrix} \Delta v_B^1 \\ \Delta v_R^1 \\ \Delta v_B^2 \\ \Delta v_R^2 \end{pmatrix} \quad (6)$$

Thus, the pressure change amount $\Delta P$, the temperature change amount $\Delta T$, and the strain change amount $\Delta \varepsilon$ of a measurement object can be calculated from the measurement values of the frequency shifts, using Eq. (6).

In addition, from Eqs. (4) to (6), the temperature T, the strain c, and the pressure P can be specifically calculated using the following Eqs. (7) to (9), respectively. Here, the superscript "FIMT" in Eq. (7) and the superscript "strain" in Eq. (8) correspond to "2" in the left-hand side of the expression at the lower stage in Eq. (5).

For the example in FIG. 9, it is possible to get strain and pressure by only utilize the Rayleigh DTSS which has a higher precision than Brillouin. It was discovered as follows:

$$T = T_0 + \Delta T = T_0 + \Delta v_R^{FIMT}/C_{22} \quad (7)$$

$$\varepsilon = \varepsilon_0 + \Delta\varepsilon = \varepsilon_0 + (\Delta v_R^{strain} - \Delta T C_{22})/C_{21} \quad (8)$$

$$P = P_0 + \Delta P = P_0 + (\Delta v_R^P - \Delta T C_{22} - \Delta\varepsilon C_{21})/C_{23} \quad (9)$$

There are other possibilities of proper deployments, this technology can provide critical information to constrain DRV geometry and to optimize well spacing as well as fracturing parameters.

DETAILED DESCRIPTION

Monitor Well and Cable Deployment

The proposed workflow includes deploying a Neubrex sensing cable, or other cables with abilities to measure distributed pressure and strain, in a monitor well that is close to a monitored unconventional producer. The monitor well can be a dedicated monitor well, or a future producer. The cable must be deployed before the monitored producer is fractured to obtain a baseline measurement of the reservoir condition. The cable can be deployed outside casing and cement in place, or inside the casing by pumping or tractor. However, the latter installation method may affect the capability of reservoir pressure measurements.

Figure 1:
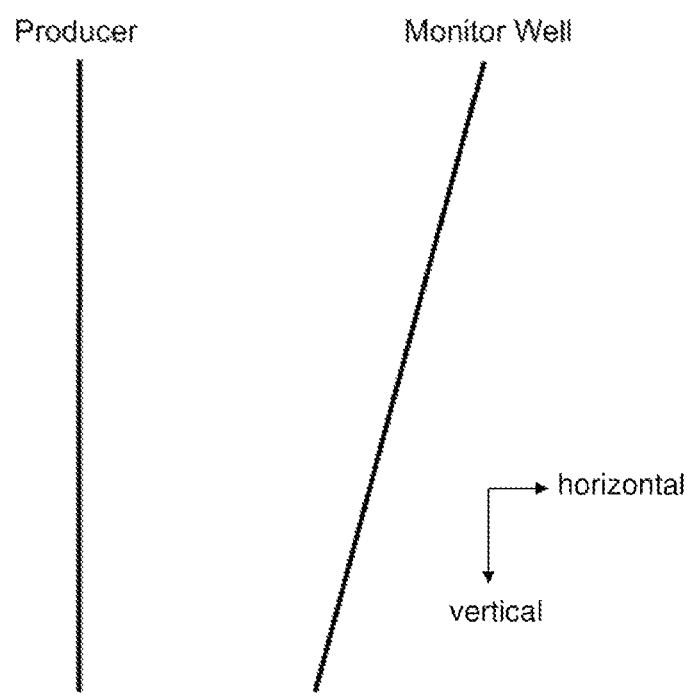
FIG. 1 is an illustration of a well spacing pilot design.

Based on the objectives, there are several ways to design the test. FIG. 1 shows a dedicated well-spacing test. The distance between the monitor well and the producer varies from 50% to 150% of designed well spacing between toe to heel, and centers at half of the proposed well spacing, while the same fracturing design is used to fracture the entire producer. The difference of the measurements observed at the monitor well mainly results from the distance variation between the two wells. This design is ideal for finding the optimized well spacing for a certain fracturing design.

Figure 2:
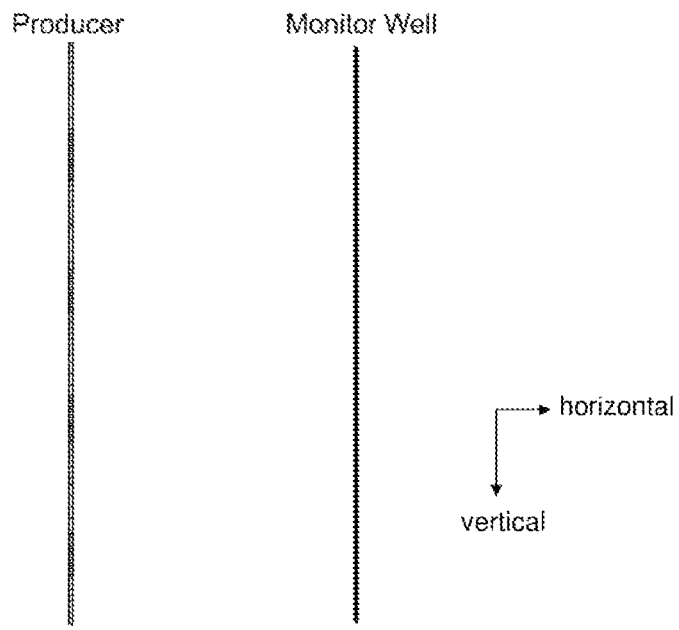
FIG. 2 is an illustration of a hydraulic fracturing parameter optimization pilot design.

FIG. 2 shows a dedicated fracturing-parameter test. Different pattern segments in the producer represent different fracking parameter designs. In this design, the distance between the monitor well and the producer remains the same for the entire horizontal section, while the fracturing parameters vary from stage to stage. The response variations along the monitor well, in this case, are mainly caused by the fracturing design variations. Due to the potential geology variations within the reservoir, It is beneficial to design the fracturing-parameter variations in an alternative fashion as shown in FIG. 2. The high spatial resolution of the Neubrex sensing system is able to separate the signals from different stages and estimate the response in a statistical way to evaluate the fracturing designs.

Figure 3:
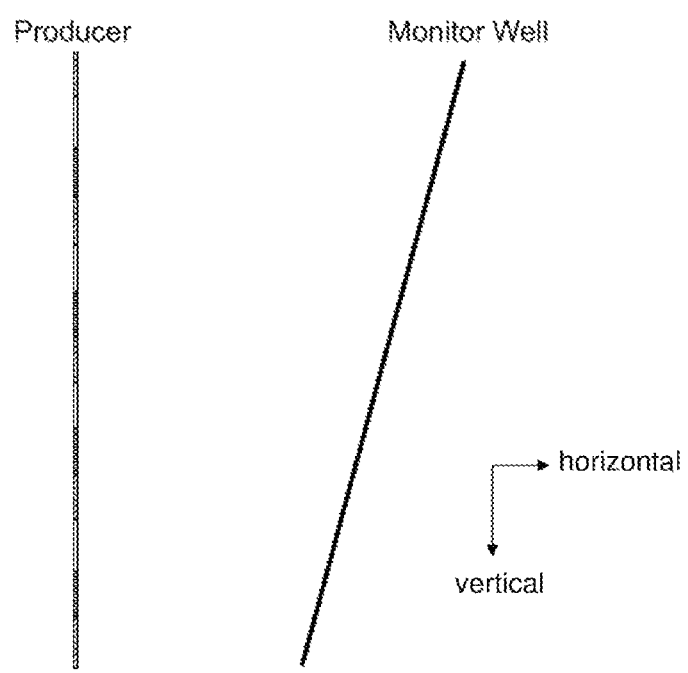
FIG. 3 is a combination of the examples of FIG. 1 and FIG. 2.

FIG. 3 shows a combination of the cases in FIGS. 1 and 2, where well spacing and fracturing parameters can be evaluated at the same time. This design is more suitable for long lateral wells where the number of stages is large enough to provide statistically significant results for different fracturing designs.

Data Acquisition and Analysis

Monitoring During Completion

Figure 4:
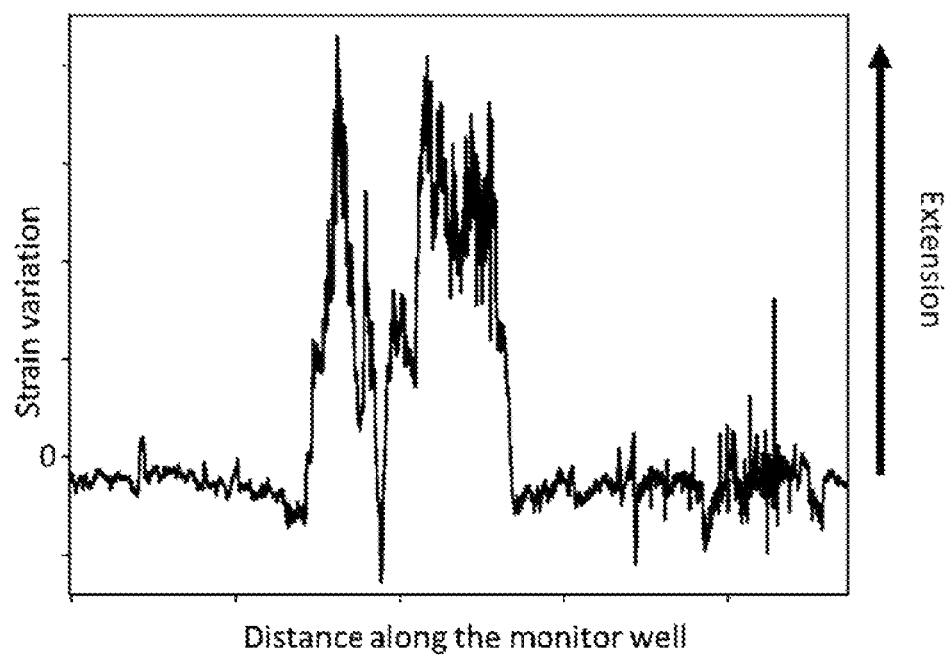
FIG. 4 is a chart of strain variation before and after a hydraulic fracturing stage at the monitor well.
Figure 5:
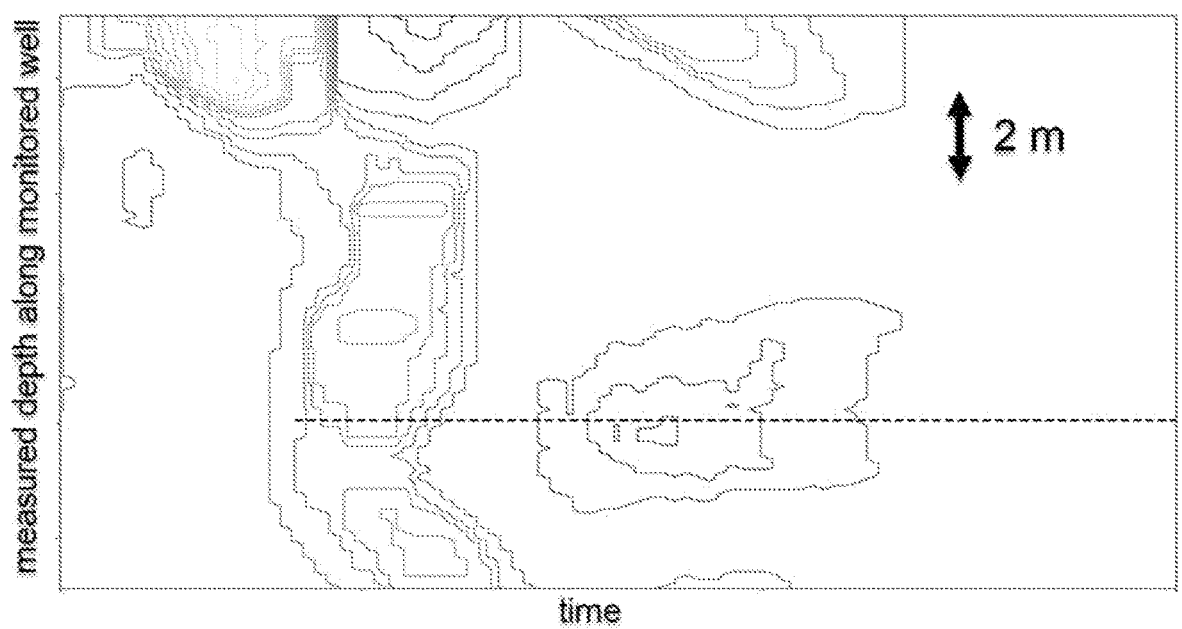
FIG. 5 is a depiction of stain rate measurement during hydraulic fracturing operation.

The Neubrex system measures temperature, strain, and pressure changes of the cable from a baseline status. A good baseline measurement is needed before the start of hydraulic fracturing operations. Afterwards, continuous data acquisition during hydraulic fracturing operation is necessary to obtain the fracture characterization, including the propagation speed and fracture geometry. The data acquisition should continue for a short period (1-2 days) after the fracturing operation to observe potential fracture closure. FIG. 4 shows an example of strain measurements during a hydraulic fracturing job. The strain difference was taken before and after a pumping stage. The positive values (extension) signals occur at a certain section of the monitor well indicating opened hydraulic fractures at these locations. The location and the magnitude of these extension signals can be used to constrain hydraulic fracture width, length, and orientation. The strain measurements can also be differentiated in time to get strain rate, which is useful to identify individual fractures, as shown in FIG. 5. A single fracture hit with width smaller than 2-m can be identified, as marked by the dashed line.

The strain measurement acquired during the fracturing stage can be used to estimate the fracture geometry. A similar application has been reported by Jin & Roy (2017) using the low-frequency component of a DAS signal. Compared to their method, the Neubrex system has several advantages. First, DAS measures strain rate, not absolute strain changes. In order to obtain absolute strain changes, a DAS system must take continuous measurements and the data have to be numerically integrated. Most of the DAS interrogators are not stable in the extra low-frequency bands (<0.1 mHz), which makes the absolute strain change measurement challenging. On the other hand, the Neubrex system can precisely measure the strain difference applied on the cable between any time intervals. Neither continuous measurement nor numerical integration is required. Secondly, conventional fiber cable installed in the monitor wells uses liquid gel to protect the fiber inside from breaking due to shock. The liquid gel causes mechanical decoupling between fiber and surrounding rocks, which compromises the strain measurement. Neubrex cable does not use gel for fiber protection, hence can provide more accurate strain measurement. Thirdly, the Neubrex measurements have a much higher spatial resolution (<1 ft) than conventional DAS measurements (>10 ft), which is critical for dense fracture measurements.

Strain changes due to fracture propagation during and after the fracturing operation at the monitor well can be used to estimate fracture geometry, including width, length and height of fractures, which is discussed in detail by Jin & Roy (2017). The fracture geometry measured during the injection stage is the geometry of the entire hydraulic fractures, which is much larger than the propped fractures from which the well produces during the production stage. As discussed before, the latter is much more important for well spacing designs.

The strain changes can also be used to evaluate well integrity, in the region where wellbore collapsing due to hydraulic fracturing is common. A similar set up can also be used to monitor the borehole integrity for conventional wells, where production induced subsidence may cause borehole damage or collapsing.

Monitoring During Production

Figure 6:
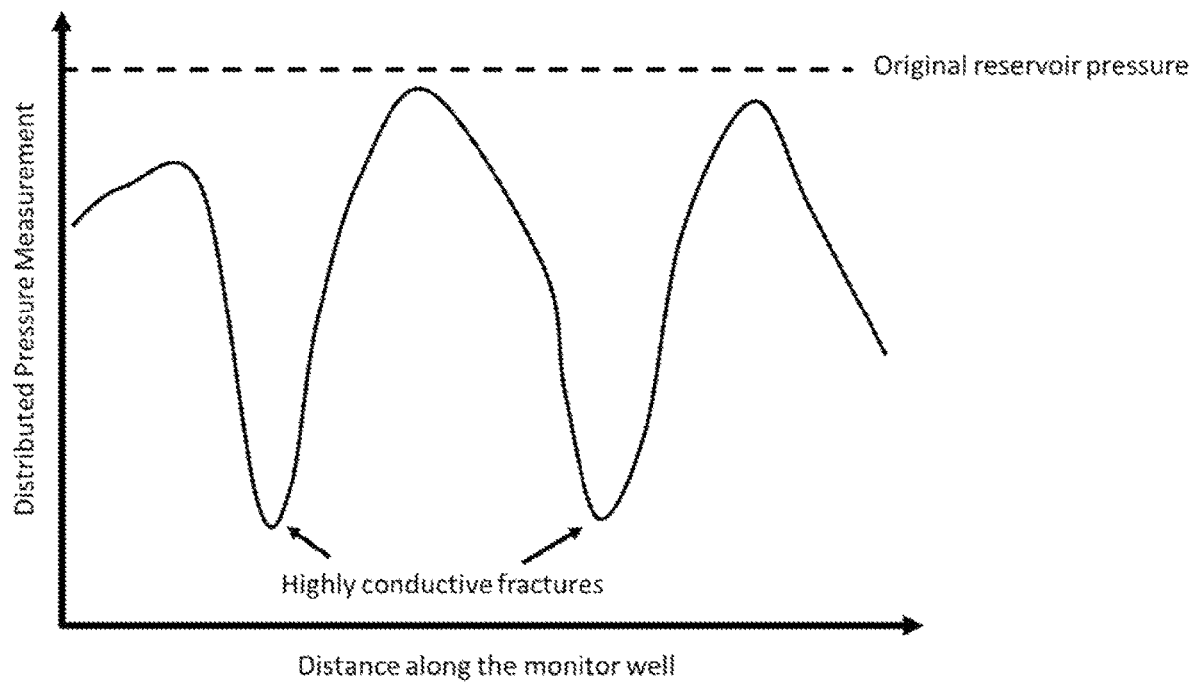
FIG. 6 is an illustration of expected distributed pressure sensing observation at the monitor well during production.

In order to constrain the geometry of DRV, measurement is necessary during the production stage. DRV can be approximated by the zone with reservoir pressure depletion during production. Raterman et al. (2019) demonstrated using distributed pressure measurements from 12 borehole pressure gauges to estimate DRV. In order to measure pressure depletion using fiber-optic based system, a good baseline measurement should be taken before the initial flowback of the production well. After the well enters the production stage, the data acquisition should be performed from once a day to once a month to monitor the production induced reservoir pressure and strain changes. Pressure measurements during production stage using the Neubrex system is significant information in this phase, because during production, pressure in the producer decreases due to reservoir fluid drainage, so does the pressure within the fractures that are connected to the producer. The distributed pressure measurement taken at the monitor well is a good indicator of the spatial variations of the reservoir conductivity to the producer. FIG. 6 illustrates an expected observation of the distributed pressure sensing system. The low-pressure regions indicate the existence of highly conductive hydraulic fractures connected to the producer. The relation between the well spacing, fracturing parameters, and the pressure depletion can be established to optimize development designs. The geometry of DRV is also time-dependent. As the pressure inside the fractures depletes, fractures start to close. The unpropped section of the fracture may be fully closed and thus lose the connection to the producer. Identifying propped fractures vs unpropped ones is important to understand the long-term DRV geometry. Distributed strain measurements during production stage, together with distributed pressure measurements, can be used to identify propped fractures. The strain variation at the monitor well during production can be explained by the fracture width decrease due to pressure depletion. If the fracture is unpropped, the relation between the fracture width and pressure can be presented as:

$$\Delta P = \alpha \Delta w \quad (10)$$

where $\alpha$ is a constant determined by the elastic properties of the reservoir rock, and $\Delta w$ is variation of fracture width, while $\Delta P$ is the variation of pressure within the fracture.

Figure 7:
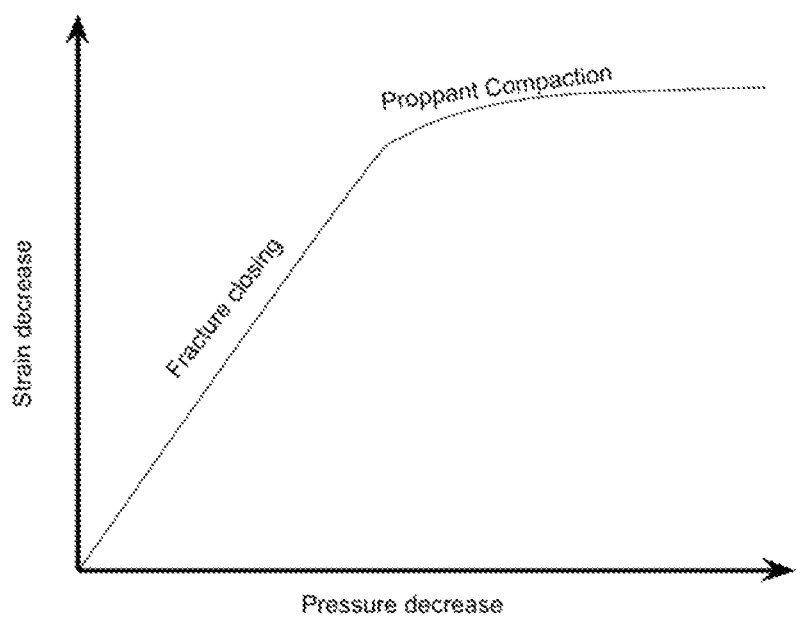
FIG. 7 is a graph depicting expected measure pressure and strain variation for a propped fracture.
Figure 8:
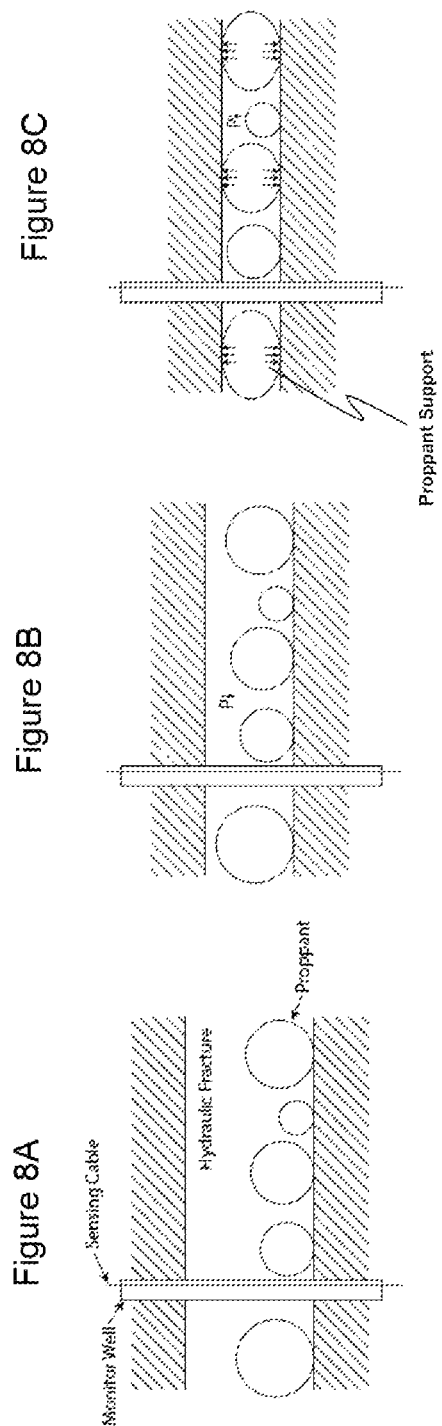
FIGS. 8A-8C are illustrations of the closure process of a fracture with proppant.

For the fractures with proppant inside, initially the pressure and strain relation will follow equation 1. FIG. 8A shows fracture status after fracturing, and FIG. 8B shows fracture status after a short period of production. As the fracture width decreases, the proppant within the fracture is compacted and induces mechanic support to the fracture, as shown in FIG. 8C. After that, the width-pressure relation becomes nonlinear, as demonstrated in FIG. 7. With this relation, the Neubrex distributed strain and pressure measurements can be used to estimate proppant transportation distance, which is another significant piece of information for well spacing optimization.

Figure 9:
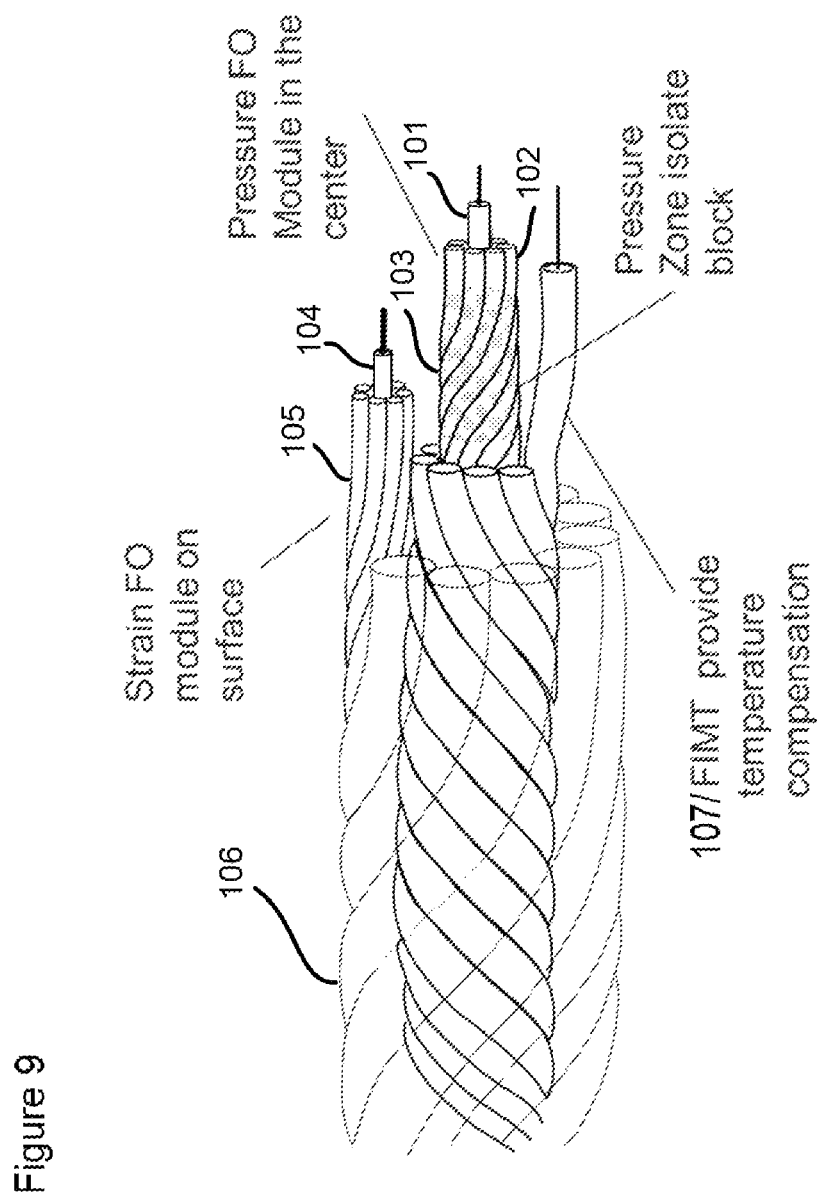
FIG. 9 is an example of a cable capable of measuring strain and pressure at the same time.

An example of a measurement optical fiber cable, which is suitable for use in the oil well production method described herein, is illustrated in FIG. 9. The measurement optical fiber cable is formed as a multilayer armored cable. It includes a pressure sensing optical fiber module including a pressure sensing optical fiber 101 provided along an axial part. A plurality of first steel wires 102 are spirally wound so as to surround the pressure sensing optical fiber 101. A flexible material 103 surrounds the pressure sensing optical fiber 101 and the plurality of first steel wires 102. A strain sensing module is provided at an outer circumferential part, and includes a strain measurement optical fiber 104 and a plurality of second steel wires 105 spirally wound so as to surround the strain measurement optical fiber 104. A plurality of third steel wires 106 are provided at the same outer circumference as the strain sensing module so as to be spirally wound. A temperature sensing optical fiber cable 107 is provided on an outer side of the pressure sensing optical fiber module. The temperature sensing optical fiber cable 107 is formed of an FIMT isolated from influence of outside pressure, and includes a temperature sensing optical fiber. The pressure sensing optical fiber module, the strain sensing module, the third steel wire, and the temperature sensing optical fiber cable form one annular body as a whole.

CONCLUSION

By properly deploying a Neubrex distributed strain, temperature, and pressure sensing cable in a monitor well near an unconventional horizontal producer, it becomes possible to estimate the geometry of the drainage reservoir volume and optimize well spacing as well as completion designs of unconventional plays.

The invention claimed is:
1. An oil well production method in which a plurality of producers are spaced from one another along a horizontal direction, the method comprising:
   boring a monitor well adjacent, in the horizontal direction, to one of the producers;
   installing a measurement optical fiber cable in the monitor well;
   performing a Brillouin measurement and a Rayleigh measurement for a strain distribution, a pressure distribution, and a temperature distribution of the monitor well along the measurement optical fiber cable over a period in which a fracture occurs hydraulically due to water pressure in the producers and an oil producing period; and
   analyzing data measured through the Brillouin measurement and the Rayleigh measurement and indicative of the strain distribution, the pressure distribution, and the temperature distribution, and determining a spacing between the producers in the horizontal direction and a hydraulic fracturing parameter based on the measured data that is indicative of the strain distribution, the pressure distribution, and the temperature distribution.
2. The oil well production method according to claim 1, wherein
   in providing the monitor well adjacent to the one producer, a separation distance therebetween is set to gradually vary in a vertical direction from 0.5 times to 1.5 times a predetermined spacing in the horizontal direction between the producers adjacent to each other.

3. The oil well production method according to claim 1, wherein
the one producer is formed of three or more segments having different fracturing parameters.

4. An oil well production method in which a plurality of producers are spaced from one another along a horizontal direction, the method comprising:
boring a monitor well adjacent, in the horizontal direction, to one of the producers;
installing a measurement optical fiber cable in the monitor well;
performing a Brillouin measurement and a Rayleigh measurement for a strain distribution, a pressure distribution, and a temperature distribution of the monitor well along the measurement optical fiber cable over a period in which a fracture occurs hydraulically due to water pressure in the producers and an oil producing period;
analyzing data measured through the Brillouin measurement and the Rayleigh measurement, and determining a spacing between the producers in the horizontal direction and a hydraulic fracturing parameter based on the measured data; and
estimating a drainage reservoir volume (DRV) through a life of the producer represented by a rock volume of the producer, based on an amount of reduction in pressure measured at the monitor well during the oil producing period by the Brillouin measurement and the Rayleigh measurement using the measurement optical fiber cable.

5. The oil well production method according to claim 4, wherein
a width W of the fracture and a value P of the pressure have a relationship $$(\Delta P = \alpha \Delta W),$$

where α is a constant determined by elastic properties of a reservoir rock.

6. An oil well production method in which a plurality of producers are spaced from one another along a horizontal direction, the method comprising:
boring a monitor well adjacent, in the horizontal direction, to one of the producers;
installing a measurement optical fiber cable in the monitor well;
performing a Brillouin measurement and a Rayleigh measurement for a strain distribution, a pressure distribution, and a temperature distribution of the monitor well along the measurement optical fiber cable over a period in which a fracture occurs hydraulically due to water pressure in the producers and an oil producing period;
analyzing data measured through the Brillouin measurement and the Rayleigh measurement, and determining a spacing between the producers in the horizontal direction and a hydraulic fracturing parameter based on the measured data; and
evaluating a movement distance of a proppant of the fracture based on measurement for strain and pressure by the Brillouin measurement and the Rayleigh measurement using the measurement optical fiber cable.

7. A measurement optical fiber cable used for the oil well production method according to claim 1, the measurement optical fiber cable being formed as a multilayer armored cable, the measurement optical fiber cable comprising:
a pressure sensing optical fiber module including a pressure sensing optical fiber provided at an axial part, a plurality of first steel wires spirally wound so as to surround the pressure sensing optical fiber, and a flexible material surrounding the pressure sensing optical fiber and the plurality of first steel wires;
a strain sensing module provided at an outer circumferential part and including a strain measurement optical fiber and a plurality of second steel wires spirally wound so as to surround the strain measurement optical fiber;
a plurality of third steel wires provided at the same outer circumference as the strain sensing module so as to be spirally wound, the third steel wires being different from the first and second steel wires; and
a temperature sensing optical fiber cable provided on an outer side of the pressure sensing optical fiber module, the temperature sensing optical fiber cable being formed of a fiber in metal tube (FIMT) isolated from influence of outside pressure and including a temperature sensing optical fiber, wherein
the pressure sensing optical fiber module, the strain sensing module, the third steel wire, and the temperature sensing optical fiber cable form one annular body as a whole.

* * * * *